(12) United States Patent
Niwa et al.

(10) Patent No.: US 12,441,194 B2
(45) Date of Patent: Oct. 14, 2025

(54) DETECTING AN IMPEDANCE ABNORMALITY IN A CHARGING PATH

(71) Applicant: TOYOTA JIDOSHA KABUSHIKI KAISHA, Toyota (JP)

(72) Inventors: Yamato Niwa, Kariya (JP); Toshihiko Minamii, Nisshin (JP); Toru Ando, Obu (JP); Yu Shimizu, Nagakute (JP); Toshiki Miyazaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 207 days.

(21) Appl. No.: 18/081,891

(22) Filed: Dec. 15, 2022

(65) Prior Publication Data

US 2023/0302912 A1    Sep. 28, 2023

(30) Foreign Application Priority Data

Feb. 8, 2022   (JP) .................... 2022-017876

(51) Int. Cl.
*B60L 3/04*       (2006.01)
*B60L 53/16*      (2019.01)
*B60L 53/18*      (2019.01)

(52) U.S. Cl.
CPC .......... *B60L 3/04* (2013.01); *B60L 53/16* (2019.02); *B60L 53/18* (2019.02)

(58) Field of Classification Search
CPC .. B60L 3/04; B60L 53/16; B60L 53/18; B60L 2240/547; B60L 2240/549
See application file for complete search history.

(56) References Cited

U.S. PATENT DOCUMENTS

| | | | |
|---|---|---|---|
| 11,005,283 B2* | 5/2021 | Cruz | H02J 7/007 |
| 2003/0164722 A1* | 9/2003 | Ajit | H03K 19/00384 |
| | | | 327/108 |
| 2011/0181104 A1* | 7/2011 | Kamaga | B60L 50/16 |
| | | | 307/9.1 |

(Continued)

FOREIGN PATENT DOCUMENTS

| | | |
|---|---|---|
| CN | 103477529 A | 12/2013 |
| EP | 2701267 A1 | 2/2014 |

(Continued)

OTHER PUBLICATIONS

JP-2011015581-A English Translation (Year: 2024).*

*Primary Examiner* — Erin M Piateski
*Assistant Examiner* — Gabriel Joseph Rene Lambert
(74) *Attorney, Agent, or Firm* — Dinsmore & Shohl LLP

(57) ABSTRACT

A vehicle configured such that an on-board battery is chargeable by receiving electric power from a power supply outside the vehicle includes an inlet, a voltage sensor that detects an input voltage that is a voltage input from the power supply to the inlet, and a control device configured to execute a detection process when connected to the inlet. The detection process includes a first process that suspends charging when a difference between the input voltage before a start of the charging and the input voltage after the start of the charging is equal to or larger than a threshold value, and a second process that stops the charging when a difference between the input voltage during suspension of the charging in the first process and the input voltage after resumption of the charging is equal to or larger than the threshold value.

9 Claims, 10 Drawing Sheets

(56) References Cited

U.S. PATENT DOCUMENTS

| | | | |
|---|---|---|---|
| 2013/0093384 A1* | 4/2013 | Nyu | G01R 31/382 320/107 |
| 2014/0015486 A1* | 1/2014 | Nishio | H02J 3/14 320/109 |
| 2014/0042983 A1* | 2/2014 | Yamaguchi | H01M 10/46 320/137 |
| 2015/0115874 A1* | 4/2015 | Magnusson | B60L 53/18 320/157 |
| 2015/0303737 A1* | 10/2015 | Steinbuchel, IV | B60L 53/65 320/109 |
| 2017/0028853 A1* | 2/2017 | Elshaer | B60L 53/68 |
| 2017/0207638 A1* | 7/2017 | Kawamura | B60L 3/12 |
| 2023/0344259 A1* | 10/2023 | Xu | H02J 7/007194 |
| 2024/0030702 A1* | 1/2024 | Liu | H02J 7/0063 |

FOREIGN PATENT DOCUMENTS

| | | | | |
|---|---|---|---|---|
| EP | 2701267 B1 | 2/2014 | | |
| JP | 2011015581 A | * | 1/2011 | B60L 11/1846 |
| JP | 5359413 B2 | 12/2013 | | |
| JP | 5660203 B2 | 1/2015 | | |
| JP | 2015-208190 A | 11/2015 | | |
| WO | WO-2012129104 A1 | * | 9/2012 | B60L 11/1816 |

* cited by examiner

DETECTING AN IMPEDANCE ABNORMALITY IN A CHARGING PATH

CROSS-REFERENCE TO RELATED APPLICATION

This application claims priority to Japanese Patent Application No. 2022-017876 filed on Feb. 8, 2022, incorporated herein by reference in its entirety.

BACKGROUND

1. Technical Field

The present disclosure relates to a vehicle configured such that an on-board battery is chargeable by using electric power supplied from a power supply outside the vehicle.

2. Description of Related Art

Japanese Patent No. 5660203 (JP 5660203 B) discloses a vehicle capable of alternating current (AC) charging in which an on-board battery is charged with AC power supplied from an AC power supply outside the vehicle via a charging cable. This vehicle includes a charging circuit that converts AC power supplied from the AC power supply into direct current (DC) power for charging the battery. The vehicle detects an impedance abnormality in a charging path from the AC power supply to the vehicle when an input voltage input from the AC power supply to the charging circuit decreases over a threshold range continuously for a predetermined period.

SUMMARY

Factors in the decrease in the input voltage of the charging circuit (charger) include, in addition to the impedance abnormality in the charging path, a decrease in a voltage of electric power supplied from the AC power supply (hereinafter also referred to as "system voltage"). In the method disclosed in JP 5660203 B based on the amount of decrease in the input voltage input to the charger, there is a possibility that the impedance abnormality in the charging path cannot properly be isolated from the decrease in the system voltage.

The present disclosure can solve the above problem and the impedance abnormality in the charging path can be detected properly.

(1) A vehicle according to a first aspect of the present disclosure is a vehicle configured such that an on-board battery is chargeable by receiving electric power supplied from a power supply outside the vehicle via a charging cable. The vehicle includes an inlet to which a connector of the charging cable is connectable, a voltage sensor configured to detect an input voltage that is a voltage input from the power supply to the inlet, and a control device configured to execute a detection process in a state in which the connector is connected to the inlet. The detection process includes a first process that suspends charging when a difference between a first voltage that is the input voltage before a start of the charging and a second voltage that is the input voltage after the start of the charging is equal to or larger than a threshold value, and a second process that stops the charging when a difference between a third voltage that is the input voltage during suspension of the charging in the first process and a fourth voltage that is the input voltage after resumption of the charging is equal to or larger than the threshold value.

According to the above configuration, the first process is executed first, and the charging is suspended when the difference between the first voltage and the second voltage is equal to or larger than the threshold value. After the charging is suspended in the first process, the second process is executed, and the charging is stopped when the difference between the third voltage and the fourth voltage is equal to or larger than the threshold value. If the system voltage decreases after the acquisition of the first voltage and the difference between the first voltage and the second voltage is equal to or larger than the threshold value in the first process due to the decrease in the system voltage, it is assumed that the difference between the third voltage and the fourth voltage is smaller than the threshold value in the second process. If the difference between the first voltage and the second voltage is equal to or larger than the threshold value in the first process due to the impedance abnormality in the charging path from the power supply to the inlet, it is assumed that the difference between the third voltage and the fourth voltage is equal to or larger than the threshold value in the second process. Instead of determining the impedance abnormality in the charging path from the power supply to the inlet only by the first process, the second process is further executed to compare the difference between the third voltage and the fourth voltage with the threshold value when the charging is suspended in the first process. Therefore, the impedance abnormality in the charging path can properly be isolated from the decrease in the system voltage. Thus, the impedance abnormality in the charging path can be detected properly.

(2) In the vehicle according to the aspect described above, the control device may be configured to tentatively detect an impedance abnormality in a charging path from the power supply to the inlet when the difference between the first voltage and the second voltage is equal to or larger than the threshold value in the first process, and confirm the impedance abnormality in the charging path when the difference between the third voltage and the fourth voltage is equal to or larger than the threshold value in the second process.

According to the above configuration, the control device tentatively detects the impedance abnormality in the charging path from the power supply to the inlet and suspends the charging when the difference between the first voltage and the second voltage is equal to or larger than the threshold value in the first process. At this time, the impedance abnormality in the charging path cannot properly be isolated from the decrease in the system voltage. Therefore, the control device further executes the second process to compare the third voltage and the fourth voltage. When the difference between the third voltage and the fourth voltage is equal to or larger than the threshold value, the control device confirms the impedance abnormality in the charging path, and stops the charging. In this manner, the impedance abnormality in the charging path can be detected properly.

(3) In the vehicle according to the aspect described above, the control device may be configured to continue the charging when the difference between the third voltage and the fourth voltage is smaller than the threshold value in the second process.

When the difference between the third voltage and the fourth voltage is smaller than the threshold value in the second process, it is assumed that the difference between the first voltage and the second voltage is equal to or larger than the threshold value in the first process because the system voltage has decreased. Therefore, the charging is continued when there is no impedance abnormality in the charging path. Thus, it is possible to suppress the stop of the charging when the charging should not be stopped.

(4) In the vehicle according to the aspect described above, the voltage sensor may detect the third voltage and the fourth voltage a plurality of times, and the control device may be configured, in the second process, to confirm the impedance abnormality in the charging path when the difference between the third voltage and the fourth voltage is equal to or larger than the threshold value consecutively the plurality of times.

According to the above configuration, the occurrence of erroneous determination due to noise or the like can be reduced by comparing the difference between the third voltage and the fourth voltage with the threshold value a plurality of times in the second process.

(5) In the vehicle according to the aspect described above, the control device may be configured to acquire the second voltage within a predetermined period after acquisition of the first voltage in the first process, and acquire the fourth voltage within the predetermined period after acquisition of the third voltage in the second process.

According to the above configuration, fluctuation in the system voltage in the period between the acquisition of the first voltage and the acquisition of the second voltage can be suppressed by acquiring the second voltage within the predetermined period after the acquisition of the first voltage. As a result, it is possible to reduce the occurrence of a case where the impedance abnormality in the charging path is tentatively detected. Thus, the period required for the charging can be shortened by omitting the suspension of the charging along with the tentative detection. Further, fluctuation in the system voltage in the period between the acquisition of the third voltage and the acquisition of the fourth voltage can be suppressed by acquiring the fourth voltage within the predetermined period after the acquisition of the third voltage. As a result, it is possible to suppress erroneous detection of the impedance abnormality in the charging path.

(6) In the vehicle according to the aspect described above, the control device may be configured to set the threshold value based on a rated current of the charging cable.

The amount of voltage decrease from the input voltage before the start of the charging to the input voltage after the start of the charging is proportional to the magnitude of a charging current. By setting the threshold value based on the rated current of the charging cable, it is possible to properly make a determination with respect to the difference between the first voltage and the second voltage and the difference between the third voltage and the fourth voltage.

(7) The vehicle according to the aspect described above may further include a current sensor configured to detect an input current that is a current input from the power supply to the inlet. The control device may be configured to set the threshold value based on the input current.

By setting the threshold value based on the actual input current (that is, the charging current), it is possible to properly make a determination with respect to the difference between the first voltage and the second voltage and the difference between the third voltage and the fourth voltage.

(8) In the vehicle according to the aspect described above, the control device may be configured to compare a rated current of the charging cable with a preset threshold current, and the control device may be configured not to execute the detection process when the rated current is equal to or larger than the preset threshold current.

(9) A vehicle according to a second aspect of the present disclosure is a vehicle configured such that an on-board battery is chargeable by receiving electric power supplied from a power supply outside the vehicle via a charging cable. The vehicle includes an inlet to which a connector of the charging cable is connectable, a voltage sensor configured to detect an input voltage that is a voltage input from the power supply to the inlet, and a control device configured to execute a detection process in a state in which the connector is connected to the inlet. The detection process includes a first process that suspends charging when an amount of change in the input voltage per unit time is equal to or larger than a threshold value, and a second process that stops the charging when an amount of change in the input voltage per unit time after resumption of the charging subsequent to suspension of the charging in the first process is equal to or larger than the threshold value.

The system voltage may gradually fluctuate from a long-term perspective. The input voltage after the start of the charging may significantly decrease from the input voltage before the start of the charging due to, for example, the fluctuation in the system voltage. When this phenomenon is tentatively detected as the impedance abnormality in the charging path, the charging is suspended. According to the above configuration, the charging is suspended when the amount of change in the input voltage per unit time is equal to or larger than the threshold value, and then the charging is stopped when the amount of change in the input voltage per unit time after the resumption of the charging is equal to or larger than the threshold value. Even if the system voltage gradually fluctuates, its influence can be canceled by using the amount of change in the input voltage per unit time. As a result, it is possible to suppress the tentative detection of the impedance abnormality in the charging path due to the fluctuation in the system voltage.

According to the present disclosure, the impedance abnormality in the charging path can be detected properly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings.

The same or corresponding parts are denoted by the same signs throughout the drawings, and description thereof will not be repeated.

Overall Configuration

Figure 1:
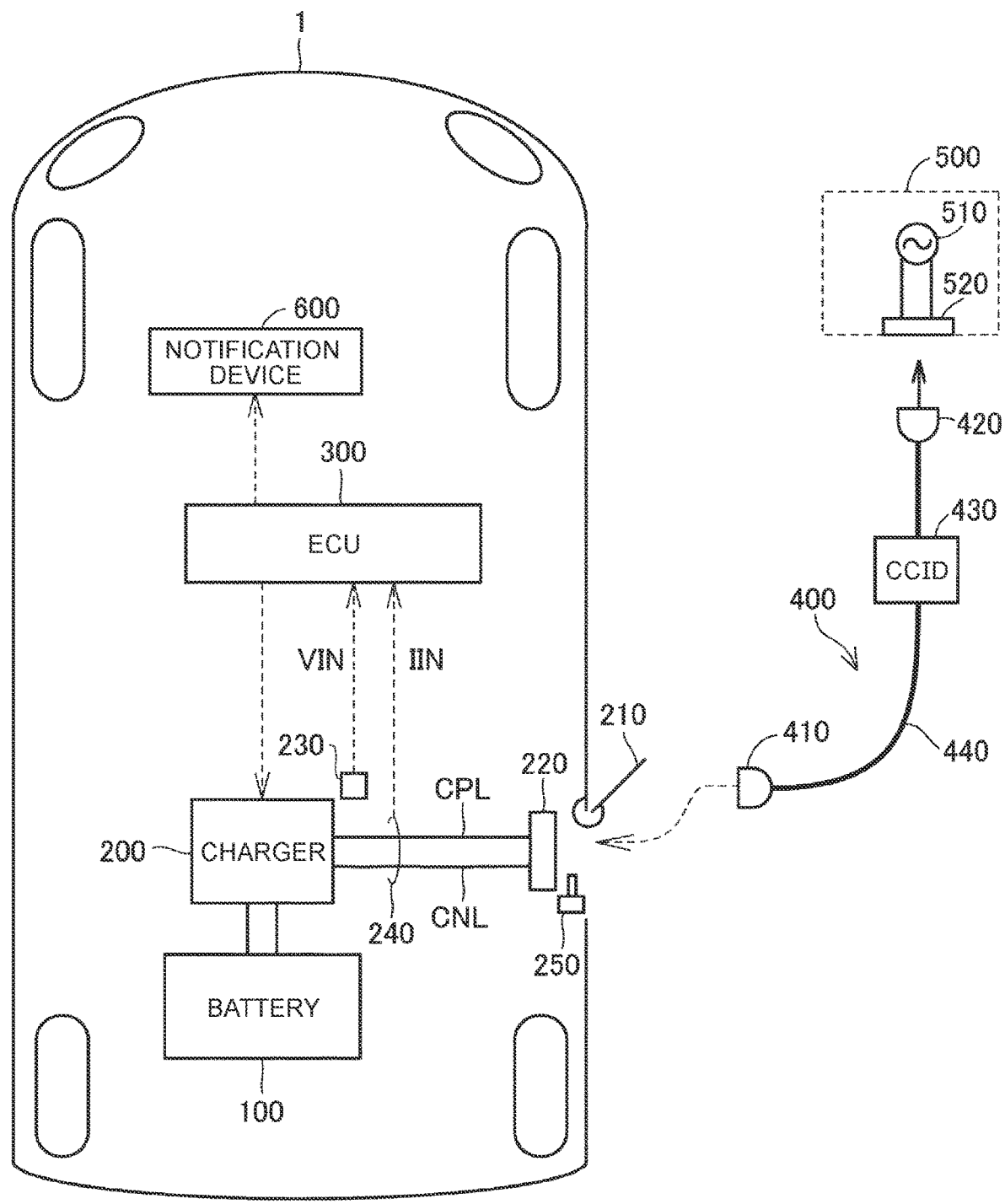
FIG. 1 is an overall configuration diagram of a vehicle according to an embodiment.

FIG. 1 is an overall configuration diagram of a vehicle 1 according to the present embodiment. The vehicle 1 is capable of AC charging in which a battery 100 mounted on the vehicle 1 is charged with AC power supplied from charging equipment 500 outside the vehicle.

The charging equipment 500 according to the present embodiment is provided at home or the like. The charging equipment 500 includes an AC power supply 510 and an outlet 520. The outlet 520 is, for example, a general household AC outlet.

During the AC charging, the charging equipment 500 and the vehicle 1 are connected by a charging cable 400. The charging cable 400 includes an AC power line 440, a charging connector 410 provided at one end of the AC power line 440, a plug 420 provided at the other end of the AC power line 440, and a charging circuit interrupt device (hereinafter also referred to as "CCID") 430 provided on the AC power line 440. The charging connector 410 is connectable to an inlet 220 of the vehicle 1. The plug 420 is connectable to the outlet 520 of the charging equipment 500. The CCID 430 is a circuit for switching supply and interruption of electric power from the charging equipment 500 to the vehicle 1.

The vehicle 1 is a battery electric vehicle that travels by driving a traveling motor (not shown) with electric power stored in the battery 100. The vehicle 1 may be any vehicle capable of external charging in which the on-board battery 100 is charged with electric power supplied from charging equipment outside the vehicle. Examples of the vehicle 1 include a fuel cell electric vehicle and a plug-in hybrid electric vehicle.

The vehicle 1 includes the battery 100, a charger 200, a charging lid 210, the inlet 220, a voltage sensor 230, a current sensor 240, an electronic control unit (ECU) 300, and a notification device 600.

The battery 100 is mounted on the vehicle 1 as a drive power supply (that is, a power source). The battery 100 includes a plurality of stacked cells. The cell is a secondary battery such as a nickel metal hydride battery or a lithium ion battery. The cell may be a battery having a liquid electrolyte between a positive electrode and a negative electrode, or may be a battery having a solid electrolyte between a positive electrode and a negative electrode (solid-state battery). The battery 100 may be any rechargeable DC power supply, and may be a large-capacity capacitor.

The ECU 300 includes a central processing unit (CPU) 310 (see FIG. 2), a memory (not shown), and an input/output buffer (not shown). The ECU 300 receives signals input from sensors and the like, outputs control signals to various devices, and controls the various devices. The control is not limited to software processing, but can also be constructed and processed by dedicated hardware (electronic circuits).

The charging connector 410 of the charging cable 400 is connectable to the inlet 220. The inlet 220 is normally covered with the charging lid 210. When the charging lid 210 is opened, a user can connect the charging connector 410 to the inlet 220. During the AC charging, the charging connector 410 is connected to the inlet 220.

A lock device 250 is provided near the inlet 220. The lock device 250 is switchable between a locked state in which removal and insertion of the charging connector 410 (charging cable 400) from and to the inlet 220 are restricted and an unlocked state in which the removal and insertion of the charging connector 410 from and to the inlet 220 are possible when the charging connector 410 is connected to the inlet 220.

The charger 200 is electrically connected between the battery 100 and the inlet 220. The charger 200 includes, for example, an AC/DC converter, a DC/AC converter, and an isolation transformer. The charger 200 converts electric power received from the charging equipment 500 via the inlet 220 into electric power for charging the battery 100 and supplies the electric power to the battery 100. The charger 200 is controlled by the ECU 300.

The voltage sensor 230 detects a voltage (input voltage) VIN between power lines CPL and CNL electrically connecting the inlet 220 and the charger 200, and outputs a signal indicating the detection result to the ECU 300. The voltage sensor 230 may be provided, for example, in the charger 200.

The current sensor 240 detects a current (charging current) IIN flowing through the power lines CPL and CNL, and outputs a signal indicating the detection result to the ECU 300. The current sensor 240 may be provided, for example, in the charger 200.

The notification device 600 includes at least one of a display device, a lighting device, and an audio output device. The notification device 600 causes the display device to display information, the lighting device to emit light, or the audio output device to output voice or sound (for example, read information) in response to a command from the ECU 300.

Figure 2:
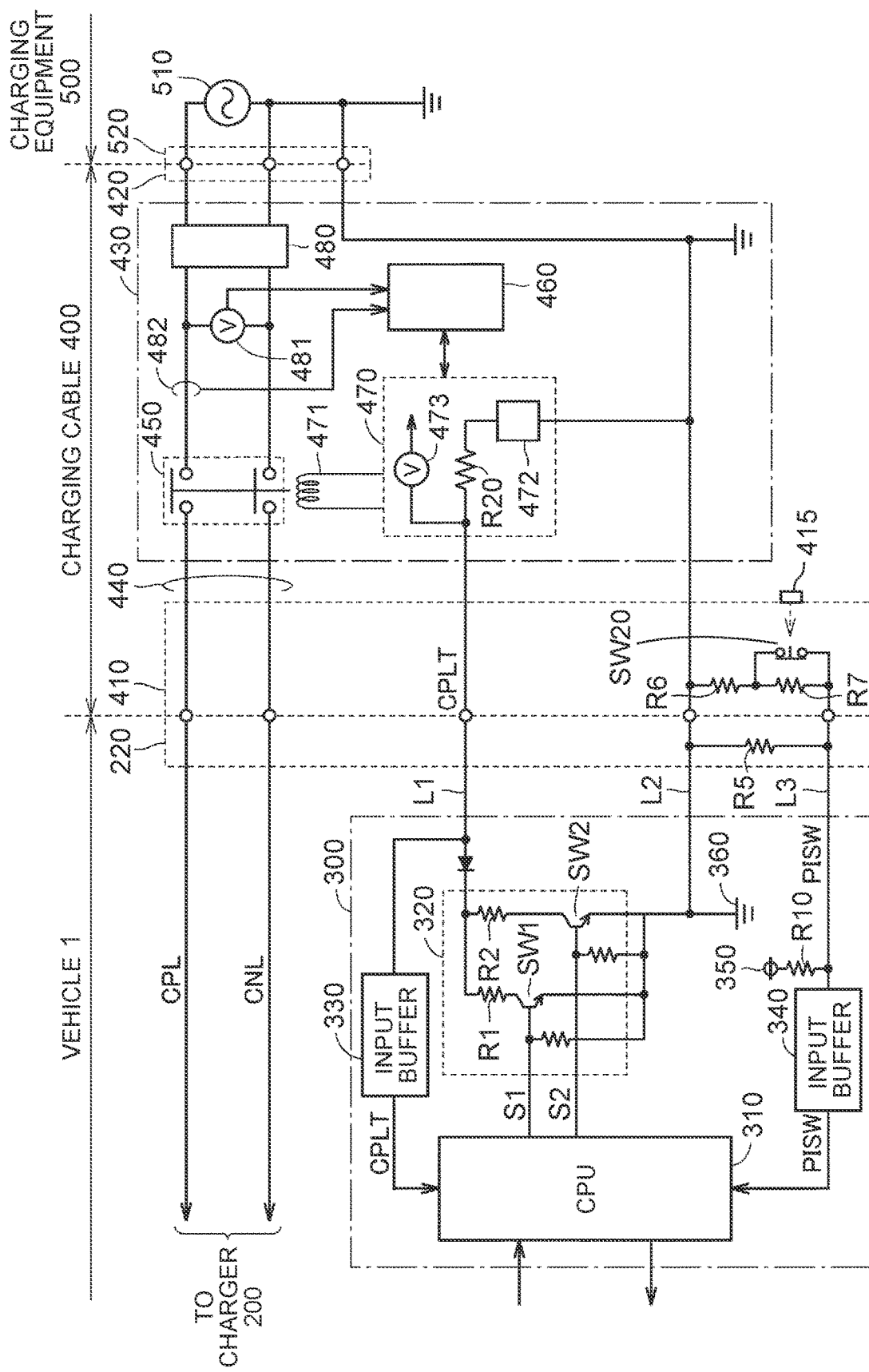
FIG. 2 is a diagram showing a configuration example of a circuit related to AC charging.

FIG. 2 is a diagram showing a configuration example of a circuit related to the AC charging. In FIG. 2, the charging connector 410 of the charging cable 400 is connected to the inlet 220.

The ECU 300 of the vehicle 1 receives a connection signal PISW whose potential changes depending on the connection status between the inlet 220 and the charging connector 410. The ECU 300 determines whether the charging connector 410 is connected to the inlet 220 based on the potential of the connection signal PISW.

When the charging cable 400 is connected to the charging equipment 500 and the inlet 220, the ECU 300 receives a pilot signal CPLT from the CCID 430 of the charging cable 400 via a signal line L1. The pilot signal CPLT is a signal for notifying the ECU 300 about a rated current of the charging cable 400 from a CPLT control circuit 470. The pilot signal CPLT has its potential manipulated by the ECU 300 of the vehicle 1, and is used as a signal for remotely controlling a CCID relay 450 from the ECU 300.

The CCID 430 in the charging cable 400 includes the CCID relay 450, a CCID control unit 460, the CPLT control circuit 470, an electromagnetic coil 471, an electric leakage detector 480, a voltage sensor 481, and a current sensor 482.

The CCID relay 450 is provided on a power supply path to the vehicle 1, and is controlled by the CPLT control circuit 470. When the CCID relay 450 is open, the power supply path is disconnected, and electric power cannot be supplied from the charging equipment 500 to the vehicle 1. When the CCID relay 450 is closed, electric power can be supplied from the charging equipment 500 to the vehicle 1 via the charging cable 400.

The CCID control unit 460 includes a CPU, a memory, an input/output port, and the like (none of which is shown). The CCID control unit 460 receives signals input from and outputs signals to various sensors and the CPLT control circuit 470, and controls operation of the CPLT control circuit 470.

The CPLT control circuit 470 outputs the pilot signal CPLT to the ECU 300 via the charging connector 410 and the inlet 220. The pilot signal CPLT has its potential manipulated by the ECU 300 of the vehicle 1, and is used as a signal for remotely controlling the CCID relay 450 from the ECU 300. The CPLT control circuit 470 controls the CCID relay 450 based on the potential of the pilot signal CPLT. The pilot signal CPLT is also used as a signal for notifying the ECU 300 about the rated current of the charging cable 400 from the CPLT control circuit 470.

Specifically, the CPLT control circuit 470 includes an oscillator 472, a resistor R20, and a voltage sensor 473.

The oscillator 472 outputs a non-oscillating pilot signal CPLT when the potential of the pilot signal CPLT detected by the voltage sensor 473 is a specified potential V1 (for example, 12 V), and outputs a pilot signal CPLT that oscillates at a specified frequency (for example, 1 kHz) and in a duty cycle under control of the CCID control unit 460 when the potential of the pilot signal CPLT decreases to a potential V2 (for example, 9 V) lower than the specified potential V1.

The duty cycle of the pilot signal CPLT is set based on the rated current of the charging cable 400. The ECU 300 of the vehicle 1 can detect the rated current of the charging cable 400 based on the duty of the pilot signal CPLT received from the CPLT control circuit 470 via the signal line L1.

When the potential of the pilot signal CPLT decreases to V3 (for example, 6 V) lower than V2, the CPLT control circuit 470 supplies a current to the electromagnetic coil 471. When the current is supplied from the CPLT control circuit 470 to the electromagnetic coil 471, the electromagnetic coil 471 generates an electromagnetic force and the CCID relay 450 is closed. As a result, a power supply voltage (voltage from the charging equipment 500) is applied to the inlet 220 of the vehicle 1 via the charging cable 400.

The electric leakage detector 480 is provided midway along the AC power line 440 of the charging cable 400 inside the CCID 430, and detects whether electric leakage has occurred. Specifically, the electric leakage detector 480 detects an equilibrium state of currents flowing in opposite directions through paired power lines constituting the AC power line 440, and detects the occurrence of electric leakage when the equilibrium state is broken. When the electric leakage detector 480 detects the electric leakage, the power supply to the electromagnetic coil 471 is stopped and the CCID relay 450 is opened.

When the plug 420 of the charging cable 400 is inserted into the outlet 520, the voltage sensor 481 detects a power supply voltage transmitted from the charging equipment 500, and notifies the CCID control unit 460 about the detected value. The current sensor 482 detects a charging current flowing through the AC power line 440, and notifies the CCID control unit 460 about the detected value.

The charging connector 410 includes resistors R6 and R7 and a switch SW20. The resistors R6 and R7 and the switch SW20 together with a power supply node 350 and a pull-up resistor R10 provided in the ECU 300 of the vehicle 1 and a resistor R5 provided in the inlet 220 constitute a circuit for detecting the connection status between the charging connector 410 and the inlet 220.

The resistors R6 and R7 are connected in series between a ground line L2 and a connection signal line L3. The switch SW20 is connected in parallel with the resistor R7. The switch SW20 is, for example, a limit switch whose contact is closed when the charging connector 410 is connected to the inlet 220. The switch SW20 operates in conjunction with a push button 415 provided on the charging connector 410. The push button 415 is operated by the user when removing the charging connector 410 from the inlet 220. When the push button 415 is not pushed, the switch SW20 is closed. When the push button 415 is pushed, the switch SW20 is opened.

With the above circuit configuration, when the charging connector 410 is not connected to the inlet 220, a signal having a potential Vx determined based on a voltage of the power supply node 350, the pull-up resistor R10, and the resistor R5 is generated in the connection signal line L3 as the connection signal PISW.

When the charging connector 410 is connected to the inlet 220 (the push button 415 is not operated), a signal having a potential Vy determined based on the voltage of the power supply node 350, the pull-up resistor R10, and the resistors R5 and R6 is generated in the connection signal line L3 as the connection signal PISW. When the push button 415 is operated with the charging connector 410 inserted into the inlet 220, a signal having a potential Vz determined based on the voltage of the power supply node 350, the pull-up resistor R10, and the resistors R5 to R7 is generated in the connection signal line L3 as the connection signal PISW. Thus, the ECU 300 can detect the connection status between the charging connector 410 and the inlet 220 by detecting the potential of the connection signal PISW.

The value of the resistor R6 can be selected based on the rated current of the charging cable 400. In this case, the ECU 300 of the vehicle 1 can detect the rated current of the charging cable 400 based on the potential of the connection signal PISW when the charging connector 410 is connected to the inlet 220 (the push button 415 is not operated).

In the vehicle 1, the ECU 300 further includes the CPU 310, a resistance circuit 320, and input buffers 330 and 340 in addition to the power supply node 350 and the pull-up resistor R10.

The resistance circuit 320 is a circuit for manipulating the potential of the pilot signal CPLT communicated through the signal line L1. The resistance circuit 320 includes pull-down resistors R1 and R2 and switches SW1 and SW2. The pull-down resistor R1 and the switch SW1 are connected in series between a vehicle ground 360 and the signal line L1 through which the pilot signal CPLT is communicated. The pull-down resistor R2 and the switch SW2 are also connected in series between the signal line L1 and the vehicle ground 360. The switches SW1 and SW2 are controlled to be conductive (ON) or non-conductive (OFF) based on control signals S1 and S2 from the CPU 310, respectively.

The input buffer 330 is a circuit for importing the pilot signal CPLT into the CPU 310 from the signal line L1. The input buffer 340 is a circuit for importing the connection signal PISW into the CPU 310 from the connection signal line L3.

The CPU 310 receives the pilot signal CPLT from the input buffer 330. The CPU 310 also receives the connection signal PISW from the input buffer 340. The CPU 310 detects the potential of the connection signal PISW, and detects the connection status between the inlet 220 and the charging connector 410 based on the potential of the connection signal PISW. The CPU 310 detects the rated current of the charging cable 400 by detecting the oscillation state and the duty cycle of the pilot signal CPLT.

When the charging connector 410 is connected to the inlet 220, the CPU 310 controls the switches SW1 and SW2 in the resistance circuit 320 to manipulate the potential of the pilot signal CPLT, thereby requesting the electric power supply and the stop of the electric power supply from the charging equipment 500. Specifically, the CPU 310 remotely controls the CCID relay 450 in the charging cable 400 by manipulating the potential of the pilot signal CPLT.

When the contacts of the CCID relay 450 in the charging cable 400 are closed by the remote control of the CPU 310, AC power is supplied from the charging equipment 500 to the charger 200, and the preparation for the AC charging is completed. By controlling the charger 200, the CPU 310 converts the AC power from the charging equipment 500 into DC power that can charge the battery 100, and outputs the DC power to the battery 100. Accordingly, the AC charging of the battery 100 is performed.

Figure 3:
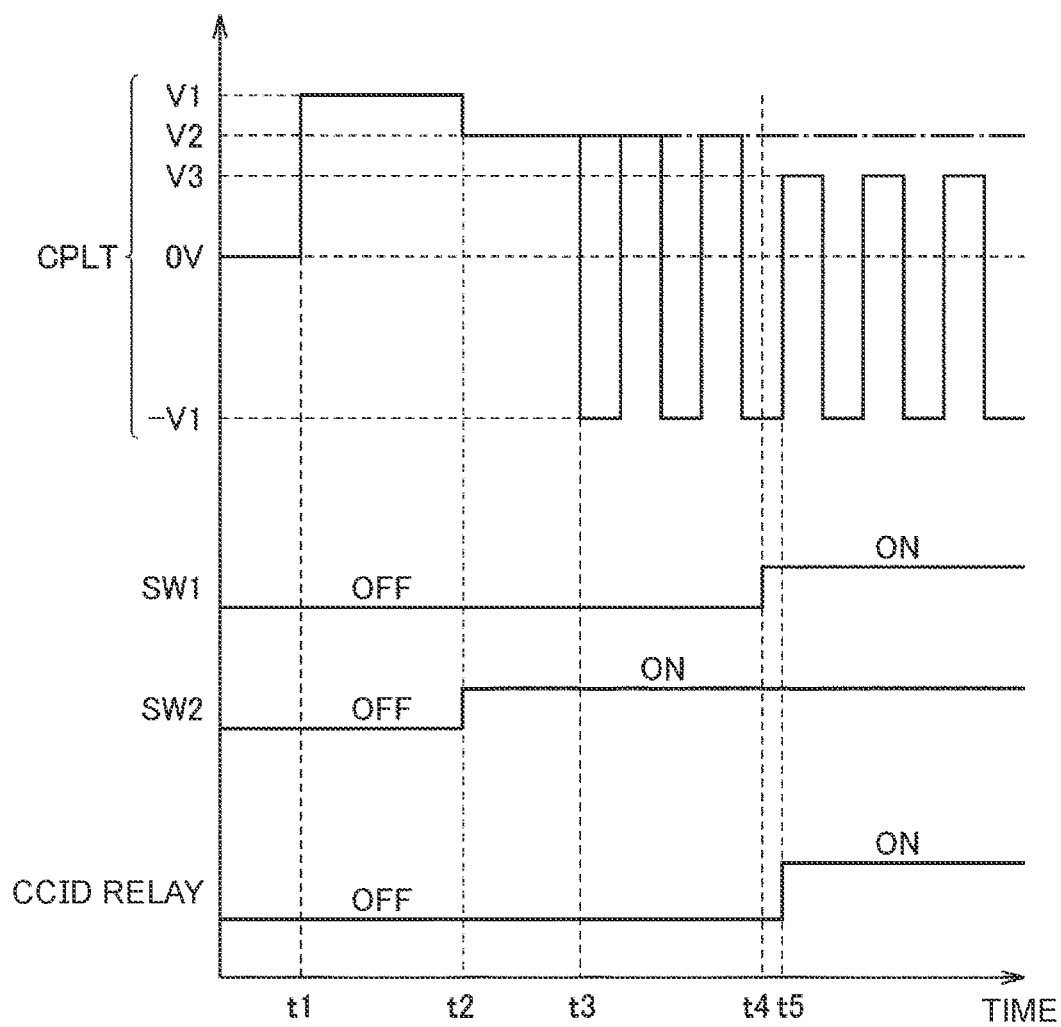
FIG. 3 is a diagram showing a correspondence relationship among the states of switches SW1 and SW2, the potential of a pilot signal CPLT, and the state of a charging circuit interrupt device (CCID) relay.

FIG. 3 is a diagram showing a correspondence relationship among the states of the switches SW1 and SW2, the potential of the pilot signal CPLT, and the state of the CCID relay 450. In FIG. 3, the horizontal axis represents time, and the vertical axis represents the potential of the pilot signal CPLT, the states of the switches SW1 and SW2, and the state of the CCID relay 450.

The charging cable 400 is not connected to the vehicle 1 or the charging equipment 500 until a time t1. In this state, the switches SW1 and SW2 and the CCID relay 450 are OFF, and the potential of the pilot signal CPLT is 0 V.

When the plug 420 of the charging cable 400 is connected to the outlet 520 of the charging equipment 500 at the time t1, the CPLT control circuit 470 receives electric power from the charging equipment 500 and generates a pilot signal CPLT. The charging connector 410 of the charging cable 400 is not connected to the inlet 220 at the time t1. The potential of the pilot signal CPLT is V1 (for example, 12 V), and the pilot signal CPLT is in a non-oscillating state.

When the charging connector 410 is connected to the inlet 220 at a time t2, the potential of the connection signal PISW input to the CPU 310 changes. The CPU 310 turns ON the switch SW2 in response to the change in the potential of the connection signal PISW. As a result, the potential of the pilot signal CPLT decreases to V2 (for example, 9 V) by the pull-down resistor R2.

When the CCID control unit 460 detects that the potential of the pilot signal CPLT has decreased to V2, the CCID control unit 460 outputs an oscillation command to the oscillator 472 to oscillate the pilot signal CPLT at a time t3.

When the CPU 310 detects that the pilot signal CPLT has oscillated, the CPU 310 detects the rated current of the charging cable 400 based on the duty of the pilot signal CPLT.

When the CPU 310 detects that a charging start operation has been performed at a time t4, the CPU 310 turns ON the switch SW1 in addition to the switch SW2. As a result, the potential of the pilot signal CPLT further decreases to V3 (for example, 6 V) by the pull-down resistor R1. The charging start operation may be, for example, an operation of pressing a charging start button (not shown) displayed on a human-machine interface (HMI) device (not shown) of the vehicle 1, or an operation of pressing a charging start button (not shown) provided on the charging equipment 500.

When the potential of the pilot signal CPLT decreases to V3 at a time t5, the CPLT control circuit 470 closes the contacts of the CCID relay 450. Thus, electric power from the charging equipment 500 is transmitted to the vehicle 1 via the charging cable 400. Then, the AC charging of the battery 100 is started in the vehicle 1 by controlling the charger 200 (see FIG. 1) by the CPU 310.

Detection Process

When the charger 200 is operated to perform the AC charging in a state in which the charging path (path from the AC power supply 510 to the inlet 220) includes an insufficiently connected portion or a portion having a possibility of disconnection, the voltage drops due to an increase in impedance at this portion. The voltage also drops due to an increase in the impedance in the charging path when an extension cable is used between the outlet 520 of the charging equipment 500 and the plug 420 of the charging cable 400. When the voltage drop increases, for example, the input voltage VIN falls below an operating lower limit value of the charger 200, and the charger 200 stops. Therefore, it is desirable to properly detect an impedance abnormality in the charging path.

The system voltage (voltage of the AC power supply 510) may decrease as well. For example, even if the input voltage VIN of the charger 200 is monitored by acquiring a detected value from the voltage sensor 230, determination cannot properly be made as to whether the drop in the input voltage VIN is caused by an impedance abnormality in the charging path or by a decrease in the system voltage.

Therefore, the ECU 300 of the vehicle 1 according to the present embodiment executes a detection process to separately detect the impedance abnormality in the charging path and the decrease in the system voltage, thereby properly detecting the impedance abnormality in the charging path. The detection process includes a first process for tentatively detecting an impedance abnormality in the charging path, and a second process for confirming the impedance abnormality in the charging path.

Specifically, the ECU 300 first executes the first process in a state in which the charging connector 410 is connected to the inlet 220. In the first process, the ECU 300 compares an input voltage VIN0 before the start of the AC charging with an input voltage VIN1 after the start of the AC charging. When a difference $\Delta 1$ between the two input voltages is equal to or larger than a threshold value Vth, the ECU 300 tentatively detects an impedance abnormality in the charging path, and controls the charger 200 to suspend the AC charging.

When the ECU 300 tentatively detects the impedance abnormality in the charging path in the first process (that is, suspends the AC charging), the ECU 300 executes the second process subsequently to the first process.

In the second process, the ECU 300 acquires an input voltage VIN2 in a state in which the AC charging is suspended, and controls the charger 200 again to resume the AC charging. The ECU 300 acquires an input voltage VIN3 after the resumption of the AC charging. The ECU 300 compares the input voltage VIN2 and the input voltage VIN3, and determines whether a difference $\Delta 2$ between the two input voltages is equal to or larger than the threshold value Vth. When the difference $\Delta 2$ is equal to or larger than the threshold value Vth, the ECU 300 determines that the impedance abnormality in the charging path has occurred (confirms the impedance abnormality in the charging path). When the difference $\Delta 2$ is smaller than the threshold value Vth, the ECU 300 determines that the difference $\Delta 1$ is equal to or larger than the threshold value Vth in the first process due to a decrease in the system voltage (voltage of the AC power supply 510). By executing the detection process as described above, it is possible to properly determine the impedance abnormality in the charging path. The input voltages VIN0, VIN1, VIN2, and VIN3 according to the present embodiment correspond to a first voltage, a second voltage, a third voltage, and a fourth voltage according to the present disclosure, respectively.

Figure 4:
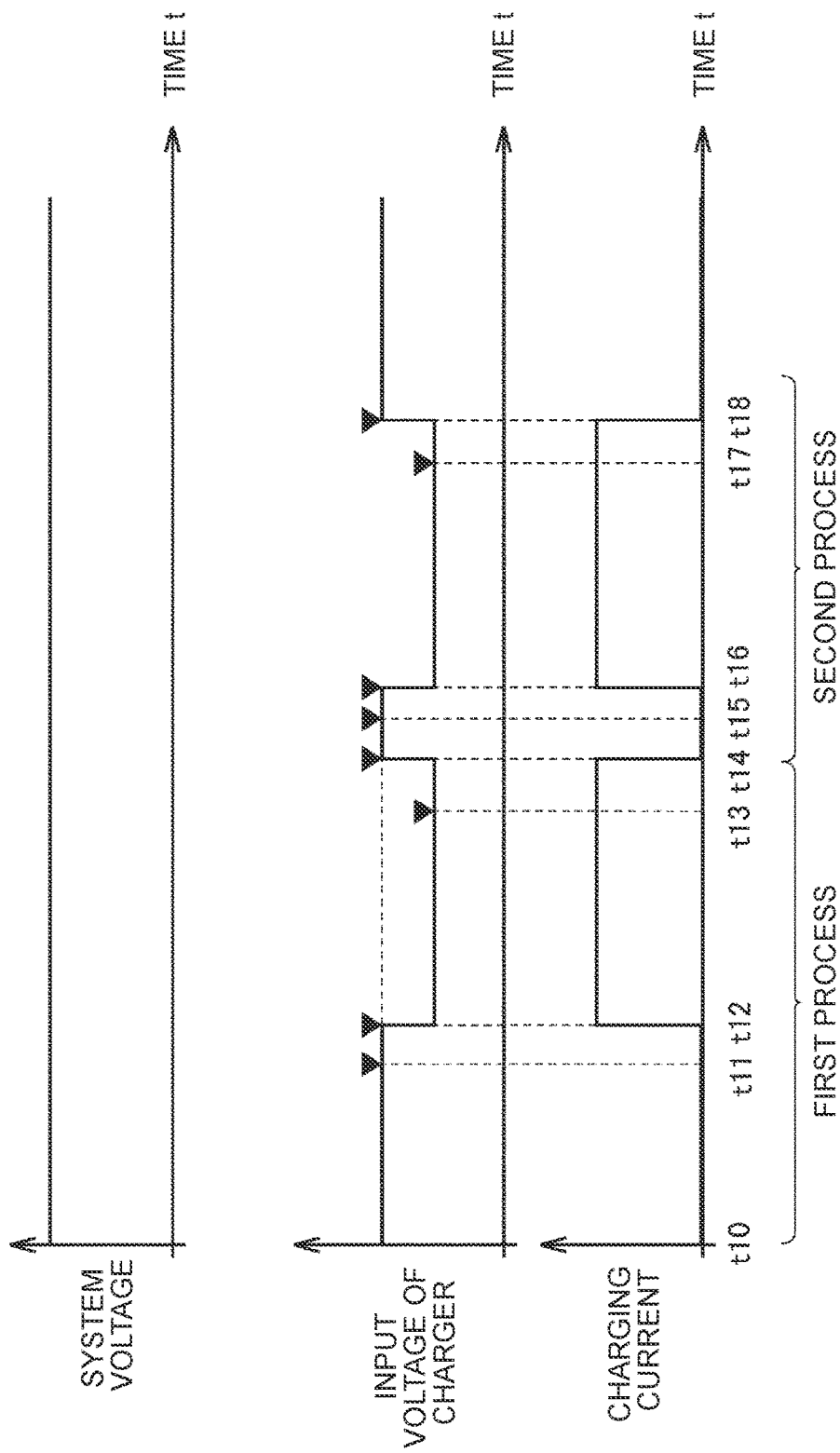
FIG. 4 is a time chart (part 1) illustrating a detection process.
Figure 5:
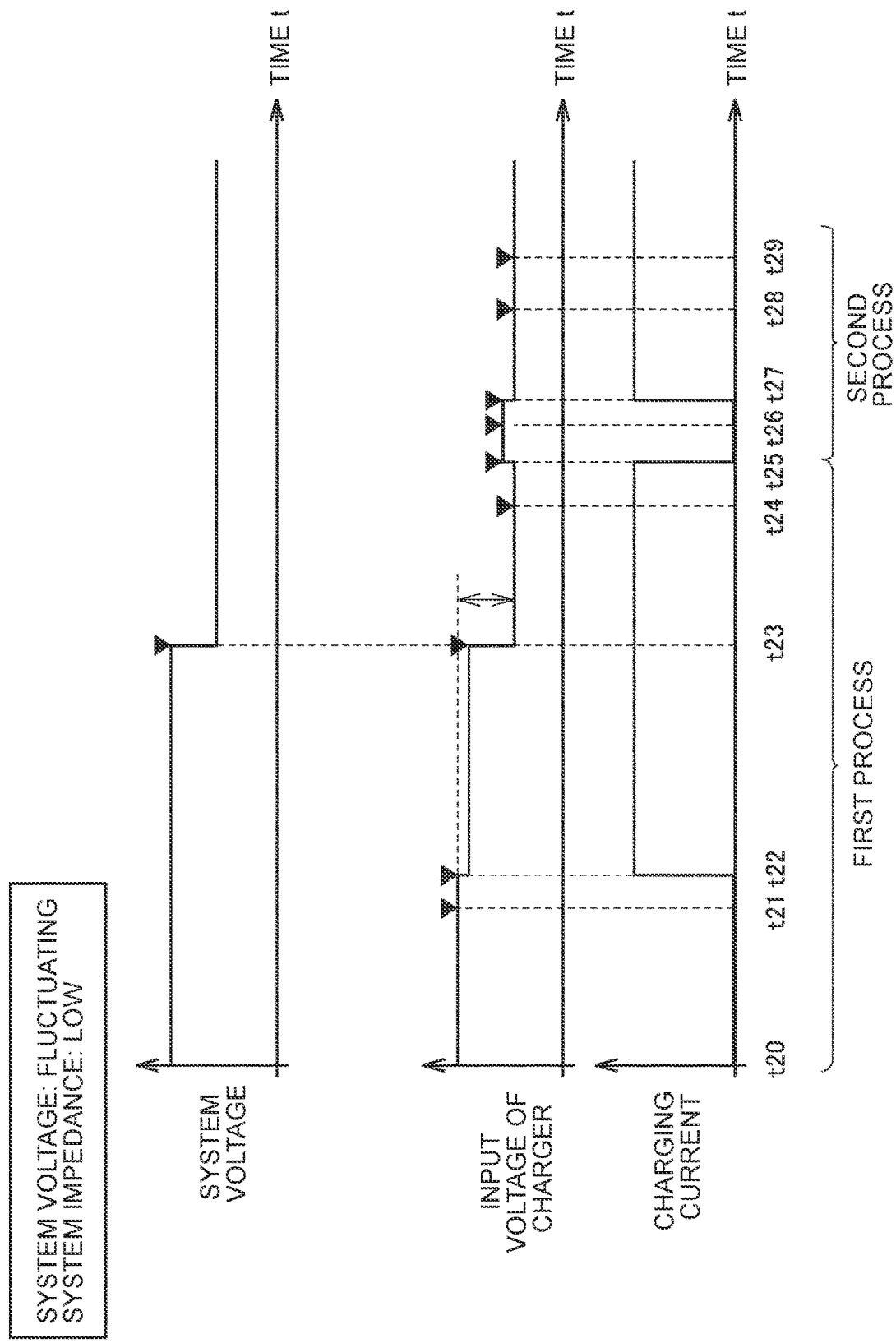
FIG. 5 is a time chart (part 2) illustrating the detection process.

The detection process will be described in more detail below by using specific examples. FIGS. 4 and 5 are time charts illustrating the detection process. FIGS. 4 and 5 show temporal changes in the system voltage, the input voltage of the charger 200, and the charging current in order from the top. In FIG. 4, it is assumed that the system voltage is constant and the impedance in the charging path (system impedance) is high (abnormal). In FIG. 5, it is assumed that the system voltage fluctuates and the impedance in the charging path (system impedance) is low (normal).

Referring to FIG. 4, description will first be given on the case where the system voltage is constant and the impedance in the charging path is abnormal.

At a time t10, the charging connector 410 is connected to the inlet 220, and a charging start operation is performed. Accordingly, the input voltage VIN from the charging equipment 500 is applied to the inlet 220 (charger 200). When the ECU 300 detects that the charging connector 410 is connected to the inlet 220, the ECU 300 starts the detection process and executes the first process.

At a time t11, the ECU 300 acquires a detected value from the voltage sensor 230, and stores the detected value as the input voltage VIN0 input to the charger 200 before the start of the AC charging.

At a time t12, the ECU 300 controls the charger 200 to start the AC charging. When the AC charging is started, the charging current flows from the charging equipment 500 to the vehicle 1 via the charging cable 400, and the input voltage VIN of the charger 200 decreases.

At a time t13, the ECU 300 acquires a detected value from the voltage sensor 230, and stores the detected value as the input voltage VIN1 input to the charger 200 after the start of the AC charging.

At a time t14, the ECU 300 calculates a difference $\Delta 1$ between the input voltage VIN0 and the input voltage VIN1, and compares the difference $\Delta 1$ with the threshold value Vth. The threshold value Vth is prepared in advance based on the rated current of the charging cable 400, and is prestored in, for example, the memory (not shown) of the ECU 300. Since the voltage drop during the AC charging increases as the charging current increases, a larger threshold value Vth is set as the rated current increases. A map showing a relationship between the threshold value Vth and the rated current may be prepared. The ECU 300 sets the threshold value Vth by checking the rated current against the map. Since the impedance in the charging path is abnormal in this case, the difference $\Delta 1$ is a value larger than the threshold value Vth. When the ECU 300 determines that the difference $\Delta 1$ is equal to or larger than the threshold value Vth, the ECU 300 tentatively detects an impedance abnormality in the charging path, and controls the charger 200 to suspend the AC charging. As a result, the charging current stops flowing and the input voltage VIN of the charger 200 increases.

When the impedance abnormality in the charging path is tentatively detected in the first process, the ECU 300 starts the second process subsequently to the first process.

At a time t15, the ECU 300 acquires a detected value from the voltage sensor 230 in a state in which the AC charging is suspended, and stores the detected value as the input voltage VIN2 input to the charger 200 during the suspension of the AC charging.

At a time t16, the ECU 300 controls the charger 200 again to resume the AC charging. As a result, the charging current flows again and the input voltage VIN of the charger 200 decreases.

At a time t17, the ECU 300 acquires a detected value from the voltage sensor 230, and stores the detected value as the input voltage VIN3 after the resumption of the AC charging.

At a time t18, the ECU 300 calculates a difference $\Delta 2$ between the input voltage VIN2 and the input voltage VIN3, and compares the difference $\Delta 2$ with the threshold value Vth. Since the impedance in the charging path is abnormal in this case, the difference $\Delta 2$ is also a value larger than the threshold value Vth similarly to the difference $\Delta 1$. When the ECU 300 determines that the difference $\Delta 2$ is equal to or larger than the threshold value Vth, the ECU 300 confirms the impedance abnormality in the charging path, and controls the charger 200 to stop the AC charging. As a result, the charging current stops flowing and the input voltage VIN of the charger 200 increases. Afterwards, the ECU 300 continues the state in which the AC charging is stopped.

For example, the ECU 300 may cause the notification device 600 to give a notification about the impedance abnormality in the charging path. For example, the notification device 600 displays the impedance abnormality in the charging path or outputs the impedance abnormality in the charging path by voice or sound in response to a command from the ECU 300.

Referring to FIG. 5, description will next be given on the case where the impedance in the charging path is normal and the system voltage fluctuates.

At a time t20, the charging connector 410 is connected to the inlet 220, and a charging start operation is performed. Accordingly, the input voltage VIN from the charging equipment 500 is applied to the inlet 220 (charger 200). When the ECU 300 detects that the charging connector 410 is connected to the inlet 220, the ECU 300 starts the detection process and executes the first process.

At a time t21, the ECU 300 acquires a detected value from the voltage sensor 230, and stores the detected value as the input voltage VIN0 input to the charger 200 before the start of the AC charging.

At a time t22, the ECU 300 controls the charger 200 to start the AC charging. When the AC charging is started, the charging current flows from the charging equipment 500 to the vehicle 1 via the charging cable 400, and the input voltage VIN of the charger 200 decreases. The amount of decrease in the input voltage VIN at this time is smaller than the amount of decrease in the input voltage VIN at the time t12 in FIG. 4 because the impedance in the charging path is normal.

At a time t23, it is assumed that the system voltage, that is, the voltage of the AC power supply 510 has decreased. Along with the decrease in the system voltage, the input voltage VIN of the charger 200 also decreases.

At a time t24, the ECU 300 acquires a detected value from the voltage sensor 230, and stores the detected value as the input voltage VIN1 input to the charger 200 after the start of the AC charging.

At a time t25, the ECU 300 calculates a difference $\Delta 1$ between the input voltage VIN0 and the input voltage VIN1, and compares the difference $\Delta 1$ with the threshold value Vth. Since the system voltage has decreased after the acquisition of the input voltage VIN0 in this case, the difference $\Delta 1$ is a value larger than the threshold value Vth. When the ECU 300 determines that the difference $\Delta 1$ is equal to or larger than the threshold value Vth, the ECU 300 tentatively detects an impedance abnormality in the charging path, and controls the charger 200 to suspend the AC charging. As a result, the charging current stops flowing and the input voltage VIN of the charger 200 increases. The amount of increase in the input voltage VIN at this time is smaller than the amount of increase in the input voltage VIN at the time t14 in FIG. 4 because the impedance in the charging path is normal.

When the impedance abnormality in the charging path is tentatively detected in the first process, the ECU 300 starts the second process subsequently to the first process.

At a time t26, the ECU 300 acquires a detected value from the voltage sensor 230 in a state in which the AC charging is suspended, and stores the detected value as the input voltage VIN2 input to the charger 200 during the suspension of the AC charging.

At a time t27, the ECU 300 controls the charger 200 again to resume the AC charging. As a result, the charging current flows again and the input voltage VIN of the charger 200 decreases.

At a time t28, the ECU 300 acquires a detected value from the voltage sensor 230, and stores the detected value as the input voltage VIN3 after the resumption of the AC charging.

At a time t29, the ECU 300 calculates a difference Δ2 between the input voltage VIN2 and the input voltage VIN3, and compares the difference Δ2 with the threshold value Vth. Since the impedance in the charging path is normal in this case, the difference Δ2 is a value smaller than the threshold value Vth. When the ECU 300 determines that the difference Δ2 is smaller than the threshold value Vth, the ECU 300 determines that the difference Δ1 is equal to or larger than the threshold value Vth in the first process due to a decrease in the system voltage (voltage of the AC power supply 510), and confirms that the impedance in the charging path is normal. In this case, the ECU 300 continues the AC charging.

As described above, the detection process according to the present embodiment is executed to separately detect the impedance abnormality in the charging path and the decrease in the system voltage. Thus, it is possible to properly detect the impedance abnormality in the charging path.

Flowchart

Figure 6:
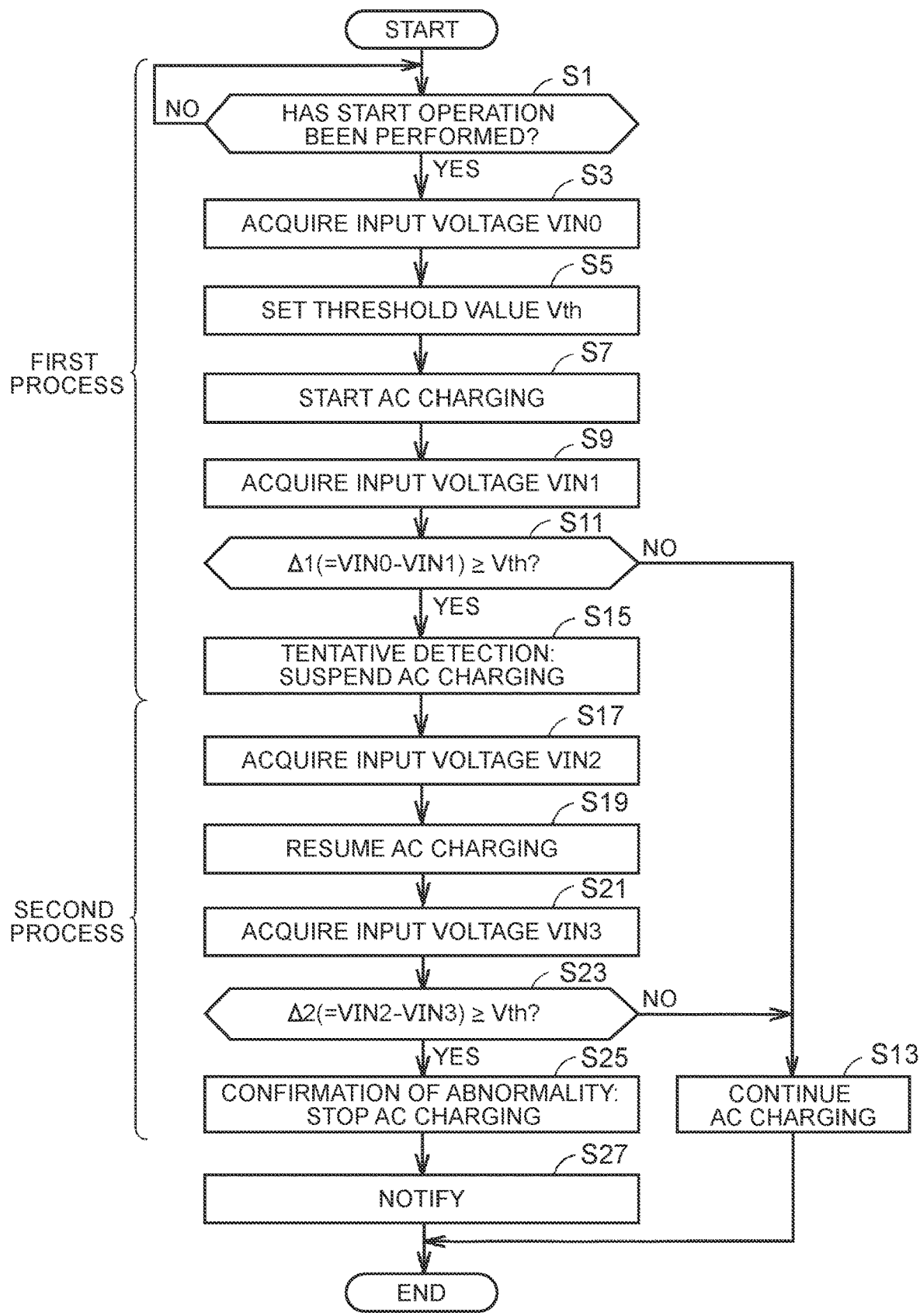
FIG. 6 is a flowchart showing a procedure of the detection process to be executed by an electronic control unit (ECU)

FIG. 6 is a flowchart showing a procedure of the detection process to be executed by the ECU 300. The process in the flowchart of FIG. 6 is started when the charging connector 410 is connected to the inlet 220. Although description will be given on a case where each step (hereinafter abbreviated as "S") in the flowchart of FIG. 6 and in flowcharts of FIGS. 7, 8, and 10 described later is implemented by software processing by the ECU 300, a part or all of the steps may be implemented by hardware (electrical circuit) provided in the ECU 300.

In S1, the ECU 300 determines whether a charging start operation has been performed. When the ECU 300 determines that the charging start operation has not been performed (NO in S1), the ECU 300 waits for the charging start operation. When the ECU 300 determines that the charging start operation has been performed (YES in S1), the process proceeds to S3.

In S3, the ECU 300 acquires a detected value from the voltage sensor 230 as the input voltage VIN0 of the charger 200 before the start of the AC charging.

In S5, the ECU 300 sets the threshold value Vth by checking the rated current of the charging cable 400 against the map described above, the rated current of the charging cable 400 being detected based on the duty of the pilot signal CPLT.

In S7, the ECU 300 controls the charger 200 to start the AC charging. In S9, the ECU 300 acquires a detected value from the voltage sensor 230 as the input voltage VIN1 of the charger 200 after the start of the AC charging.

In S11, the ECU 300 determines whether a difference Δ1 between the input voltage VIN0 and the input voltage VIN1 is equal to or larger than the threshold value Vth. When the ECU 300 determines that the difference Δ1 is smaller than the threshold value Vth (NO in S11), the process proceeds to S13. When the ECU 300 determines that the difference Δ1 is equal to or larger than the threshold value Vth (YES in S11), the process proceeds to S15.

In S13, the ECU 300 continues the AC charging because the relationship between the input voltage VIN0 and the input voltage VIN1 is normal.

In S15, the ECU 300 tentatively detects an impedance abnormality in the charging path because the relationship between the input voltage VIN0 and the input voltage VIN1 is abnormal. At this time, the ECU 300 controls the charger 200 to suspend the AC charging.

In S17, the ECU 300 acquires a detected value from the voltage sensor 230 as the input voltage VIN2 of the charger 200 during the suspension of the AC charging.

In S19, the ECU 300 controls the charger 200 to resume the suspended AC charging.

In S21, the ECU 300 acquires a detected value from the voltage sensor 230 as the input voltage VIN3 of the charger 200 after the resumption of the AC charging.

In S23, the ECU 300 determines whether a difference Δ2 between the input voltage VIN2 and the input voltage VIN3 is equal to or larger than the threshold value Vth. When the ECU 300 determines that the difference Δ2 is smaller than the threshold value Vth (NO in S23), the process proceeds to S13. When the ECU 300 determines that the difference Δ2 is equal to or larger than the threshold value Vth (YES in S23), the process proceeds to S25.

In S25, the ECU 300 confirms the impedance abnormality in the charging path because the relationship between the input voltage VIN2 and the input voltage VIN3 is abnormal. At this time, the ECU 300 controls the charger 200 to stop the AC charging.

In S27, the ECU 300 controls the notification device 600 to notify the user of the vehicle 1 that the AC charging has been stopped due to the impedance abnormality in the charging path.

As described above, the ECU 300 of the vehicle 1 according to the present embodiment executes the detection process when the AC charging is started to separately detect the impedance abnormality in the charging path and the decrease in the system voltage. The ECU 300 executes the first process in the state in which the charging connector 410 is connected to the inlet 220 to compare the input voltage VIN0 before the start of the AC charging with the input voltage VIN1 after the start of the AC charging. When the difference Δ1 between the two input voltages is equal to or larger than the threshold value Vth, the ECU 300 tentatively detects the impedance abnormality in the charging path, and controls the charger 200 to suspend the AC charging. When the ECU 300 tentatively detects the impedance abnormality in the charging path in the first process, the ECU 300 subsequently executes the second process to compare the input voltage VIN2 during the suspension of the AC charging with the input voltage VIN3 after the resumption of the AC charging and determine whether the difference Δ2 between the two input voltages is equal to or larger than the threshold value Vth. When the difference Δ2 is equal to or larger than the threshold value Vth, the ECU 300 confirms the impedance abnormality in the charging path. When the difference Δ2 is smaller than the threshold value Vth, the ECU 300 determines that the system voltage has decreased. By tentatively detecting the impedance abnormality in the charging path and then detecting the impedance abnormality in the charging path based on the input voltage VIN2 during the suspension of the AC charging and the input voltage VIN3 after the resumption of the AC charging, the impedance abnormality in the charging path can properly be isolated from the decrease in the system voltage. Thus, the impedance abnormality in the charging path can be detected properly.

First Modification

In the embodiment, description has been given on the example in which the impedance abnormality in the charging path is confirmed based on the result of one comparison between the threshold value Vth and the difference Δ2 after the impedance abnormality in the charging path has been detected tentatively, the difference Δ2 being a difference between the input voltage VIN2 during the suspension of the AC charging and the input voltage VIN3 after the resumption of the AC charging. In a first modification, description will be given on an example in which the impedance abnormality in the charging path is confirmed based on results of a plurality of comparisons between the differences Δ2 and the threshold value Vth.

Figure 7:
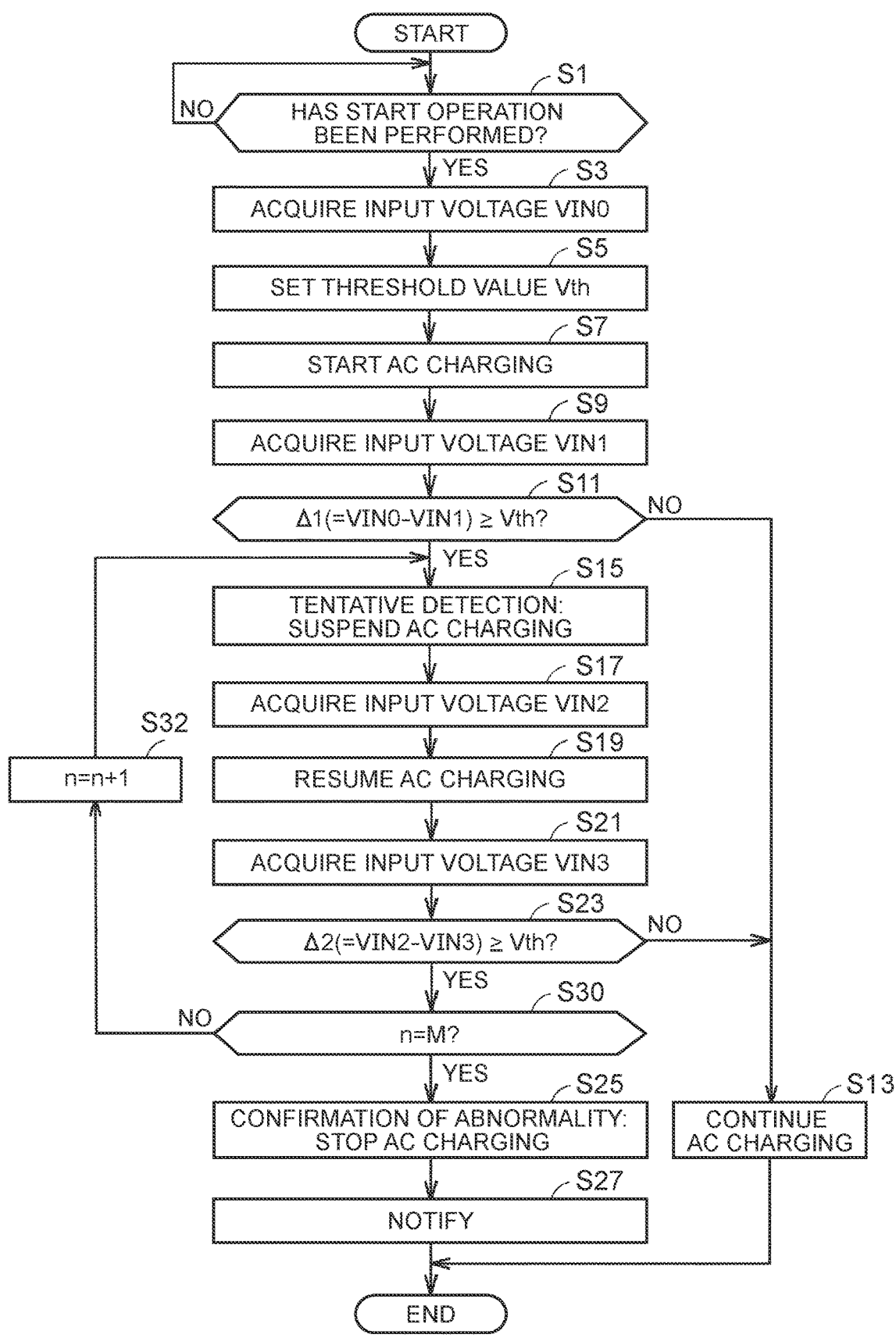
FIG. 7 is a flowchart showing a procedure of a detection process according to a first modification.

FIG. 7 is a flowchart showing a procedure of a detection process according to the first modification. Similarly to the embodiment, the process in the flowchart of FIG. 7 is started by the ECU 300 when the charging connector 410 is connected to the inlet 220. The flowchart of FIG. 7 is obtained by adding processes in S30 and S32 to the flowchart of FIG. 6. The processes in the flowchart of FIG. 7 other than S30 and S32 are the same as those in the flowchart of FIG. 6, and are therefore denoted by the same signs and description thereof will not be repeated.

In the detection process according to the first modification, a variable n is used to indicate the number of times that the difference Δ2 is equal to or larger than the threshold value Vth in comparisons between the difference Δ2 and the threshold value Vth. The variable n is a natural number, and a value "1" is input to the variable n at the start of the flowchart of FIG. 7.

When the ECU 300 determines in S23 that the difference Δ2 is equal to or larger than the threshold value Vth (YES in S23), the process proceeds to S30.

In S30, the ECU 300 determines whether the variable n is a specified value M. The specified value M is a natural number of 2 or more, and is a value that defines the number of times that the difference Δ2 is equal to or larger than the threshold value Vth in comparisons between the difference Δ2 and the threshold value Vth. The specified value M can be set as appropriate. When the variable n is not the specified value M, that is, the variable n is smaller than the specified value M (NO in S30), the ECU 300 advances the process to S32. When the variable n is the specified value M (YES in S30), the ECU 300 advances the process to S25.

In S32, the ECU 300 increments the variable n by 1 and returns the process to S15. As a result, the process in S15 and subsequent steps, that is, the comparison between the difference Δ2 and the threshold value Vth is repeated.

When the variable n reaches the specified value M, the ECU 300 advances the process to S25 to confirm the impedance abnormality in the charging path. In other words, the ECU 300 confirms the impedance abnormality in the charging path when the difference Δ2 is equal to or larger than the threshold value Vth M consecutive times.

For example, the difference Δ2 may be calculated as a large value due to noise or the like. In the first modification, the impedance abnormality in the charging path is confirmed when the difference Δ2 is equal to or larger than the threshold value Vth M consecutive times. Thus, it is possible to increase the detection accuracy for the impedance abnormality in the charging path.

Second Modification

In the first process, the input voltage VIN1 may be acquired so that the period from the acquisition of the input voltage VIN0 to the acquisition of the input voltage VIN1 is within a predetermined period. For example, when the period from the acquisition of the input voltage VIN0 to the acquisition of the input voltage VIN1 increases, the system voltage is more likely to fluctuate during that period. When the system voltage fluctuates in the period from the acquisition of the input voltage VIN0 to the acquisition of the input voltage VIN1, the impedance abnormality in the charging path may tentatively be detected in the first process even though the impedance in the charging path is normal. When the impedance abnormality in the charging path is tentatively detected, the AC charging is suspended and therefore the period required for the AC charging increases.

By setting the period from the acquisition of the input voltage VIN0 to the acquisition of the input voltage VIN1 to be within the predetermined period, the difference Δ1 can be acquired while the system voltage is stable. As a result, it is possible to reduce the occurrence of a case where the impedance abnormality in the charging path is tentatively detected due to the fluctuation in the system voltage. Thus, the period required for the AC charging can be shortened by omitting the suspension of the AC charging along with the tentative detection.

In the second process, the input voltage VIN3 may similarly be acquired so that the period from the acquisition of the input voltage VIN2 to the acquisition of the input voltage VIN3 is within a predetermined period. By setting the period from the acquisition of the input voltage VIN2 to the acquisition of the input voltage VIN3 to be within the predetermined period, the difference Δ2 can be acquired while the system voltage is stable. As a result, it is possible to suppress determination that the difference Δ2 is equal to or larger than the threshold value Vth due to the fluctuation in the system voltage.

The second modification can be combined with the first modification.

Third Modification

In the embodiment, description has been given on the example in which the charging equipment 500 is provided at home or the like and the user of the vehicle 1 connects the plug 420 of the charging cable 400 to the outlet 520 for general household use to perform the AC charging. There are cases in which the charging equipment for the AC charging may be, for example, a public charging station (not shown).

The charging station includes a charging cable. The user of the vehicle 1 cannot remove the charging cable from the charging station. The user of the vehicle 1 connects a charging connector provided at the distal end of the charging cable to the inlet 220 to perform the AC charging.

In the charging equipment 500 used in general households, there is a high risk of increase in the impedance in the charging path due to, for example, poor connection between the outlet 520 and the plug 420 or use of an extension cable between the outlet 520 and the plug 420. In the charging station, the risk of increase in the impedance in the charging path is low because the wiring work and the like are performed by a construction contractor. In a third modification, the ECU 300 of the vehicle 1 executes the detection process when the AC charging is performed by using the charging equipment 500, and does not execute the detection process when the AC charging is performed by using the charging station.

Whether the AC charging is performed by using the charging equipment 500 or by using the charging station can be determined based on, for example, a rated current of the charging cable. In general, the rated current of the charging cable 400 of the charging equipment 500 is smaller than the rated current of the charging cable of the charging station. By presetting a threshold current Ith and comparing the rated current of the charging cable with the threshold current Ith, determination can be made as to whether the AC charging is performed by using the charging equipment 500 or by using the charging station. The threshold current Ith can be pre-stored in the memory of the ECU 300.

The ECU 300 detects the rated current of the charging cable based on the duty of the pilot signal CPLT or the potential of the connection signal PISW. The ECU 300 compares the rated current and the threshold current Ith. When the rated current is smaller than the threshold current Ith, the ECU 300 determines that the AC charging is performed by using the charging equipment 500, and executes the detection process. When the rated current is equal to or larger than the threshold current Ith, the ECU 300 determines that the AC charging is performed by using the charging station, and does not execute the detection process. Therefore, it is possible to execute the detection process only when the execution of the detection process is required. Thus, computational resources can be saved by omitting the execution of an unnecessary process.

The third modification can be combined with the first and second modifications.

Fourth Modification

In the embodiment, the threshold value Vth is set based on the rated current of the charging cable 400. In a fourth modification, description will be given on an example in which the threshold value Vth is set based on the charging current.

Figure 8:
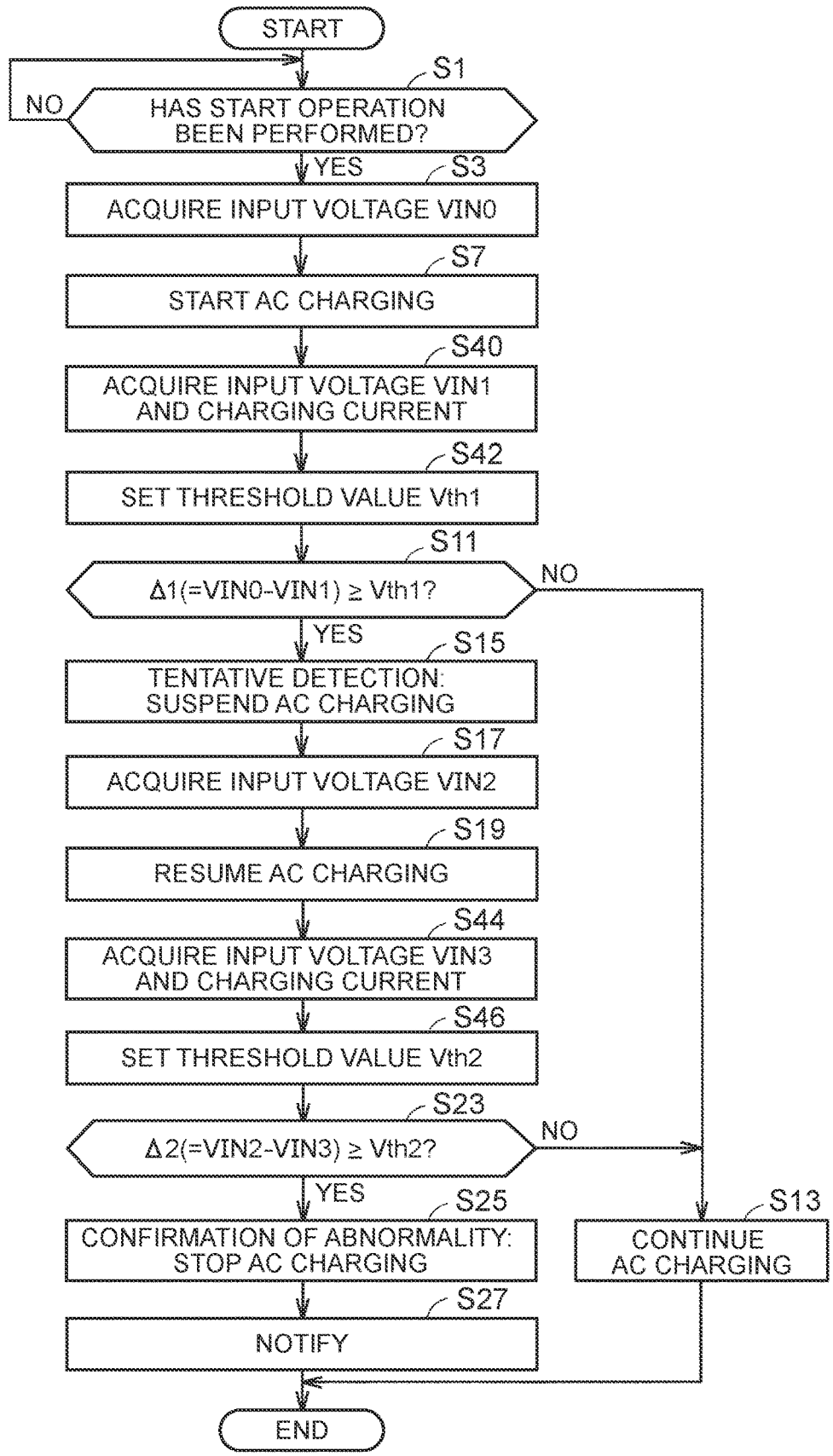
FIG. 8 is a flowchart showing a procedure of a detection process according to a fourth modification.

FIG. 8 is a flowchart showing a procedure of a detection process according to the fourth modification. Similarly to the embodiment, the process in the flowchart of FIG. 8 is started by the ECU 300 when the charging connector 410 is connected to the inlet 220. The flowchart of FIG. 8 is obtained by omitting the process in S5, changing the process in S9 to a process in S40 and the process in S21 to a process in S44, and adding processes in S42 and S46 as compared with the flowchart of FIG. 6. The other processes in the flowchart of FIG. 8 are the same as those in the flowchart of FIG. 6, and are therefore denoted by the same signs and description thereof will not be repeated.

When the ECU 300 controls the charger 200 to start the AC charging in S7, the process proceeds to S40.

In S40, the ECU 300 acquires a detected value from the voltage sensor 230 as the input voltage VIN1 of the charger 200 after the start of the AC charging. In addition, the ECU 300 acquires a detected value from the current sensor 240 as the charging current.

In S42, the ECU 300 reads, from the memory, a map that defines a relationship between a threshold value Vth1 and the charging current, and sets the threshold value Vth1 by using the charging current acquired in S40 as an argument. The map used in S42 may be, for example, the map described in the embodiment.

In S11, the ECU 300 determines whether a difference Δ1 between the input voltage VIN0 and the input voltage VIN1 is equal to or larger than the threshold value Vth1. When the ECU 300 determines that the difference Δ1 is smaller than the threshold value Vth1 (NO in S11), the process proceeds to S13. When the ECU 300 determines that the difference Δ1 is equal to or larger than the threshold value Vth1 (YES in S11), the process proceeds to S15.

When the ECU 300 controls the charger 200 to resume the suspended AC charging in S19, the process proceeds to S44.

In S44, the ECU 300 acquires a detected value from the voltage sensor 230 as the input voltage VIN3 of the charger 200 after the resumption of the AC charging. In addition, the ECU 300 acquires a detected value from the current sensor 240 as the charging current.

In S46, the ECU 300 reads, from the memory, a map that defines a relationship between a threshold value Vth2 and the charging current, and sets the threshold value Vth2 by using the charging current acquired in S44 as an argument. The map used in S46 may be, for example, the map described in the embodiment.

In S23, the ECU 300 determines whether a difference Δ2 between the input voltage VIN2 and the input voltage VIN3 is equal to or larger than the threshold value Vth2. When the ECU 300 determines that the difference Δ2 is smaller than the threshold value Vth2 (NO in S23), the process proceeds to S13. When the ECU 300 determines that the difference Δ2 is equal to or larger than the threshold value Vth2 (YES in S23), the process proceeds to S25.

The amount of decrease in the voltage due to the impedance in the charging path is proportional to the charging current. Therefore, when the charging current is large, the amount of decrease in the voltage increases even if the impedance in the charging path is normal. When the uniform threshold value Vth is used, there is a possibility that both the impedance abnormality in the charging path when the charging current is small and the impedance abnormality in the charging path when the charging current is large cannot be detected properly. By setting the threshold values Vth1 and Vth2 based on the charging current as described above, it is possible to properly detect the impedance abnormality in the charging path regardless of the magnitude of the charging current.

A threshold impedance may be used instead of the threshold value Vth. In this case, the ECU 300 calculates the impedance by dividing the difference Δ1 by the charging current acquired in S40. Then, the calculated impedance is compared with the threshold impedance, and the impedance abnormality in the charging path is tentatively detected when the calculated impedance is equal to or higher than the threshold impedance.

Then, the ECU 300 calculates the impedance by dividing the difference Δ2 by the charging current acquired in S44. Then, the calculated impedance is compared with the threshold impedance, and the impedance abnormality in the charging path is confirmed when the calculated impedance is equal to or higher than the threshold impedance.

The fourth modification can be combined with the first to third modifications.

Fifth Modification

The system voltage may gradually fluctuate from a long-term perspective. In a fifth modification, description will be given on an example in which the impedance abnormality in the charging path is detected by using a differential value of the input voltage of the charger 200.

Figure 9:
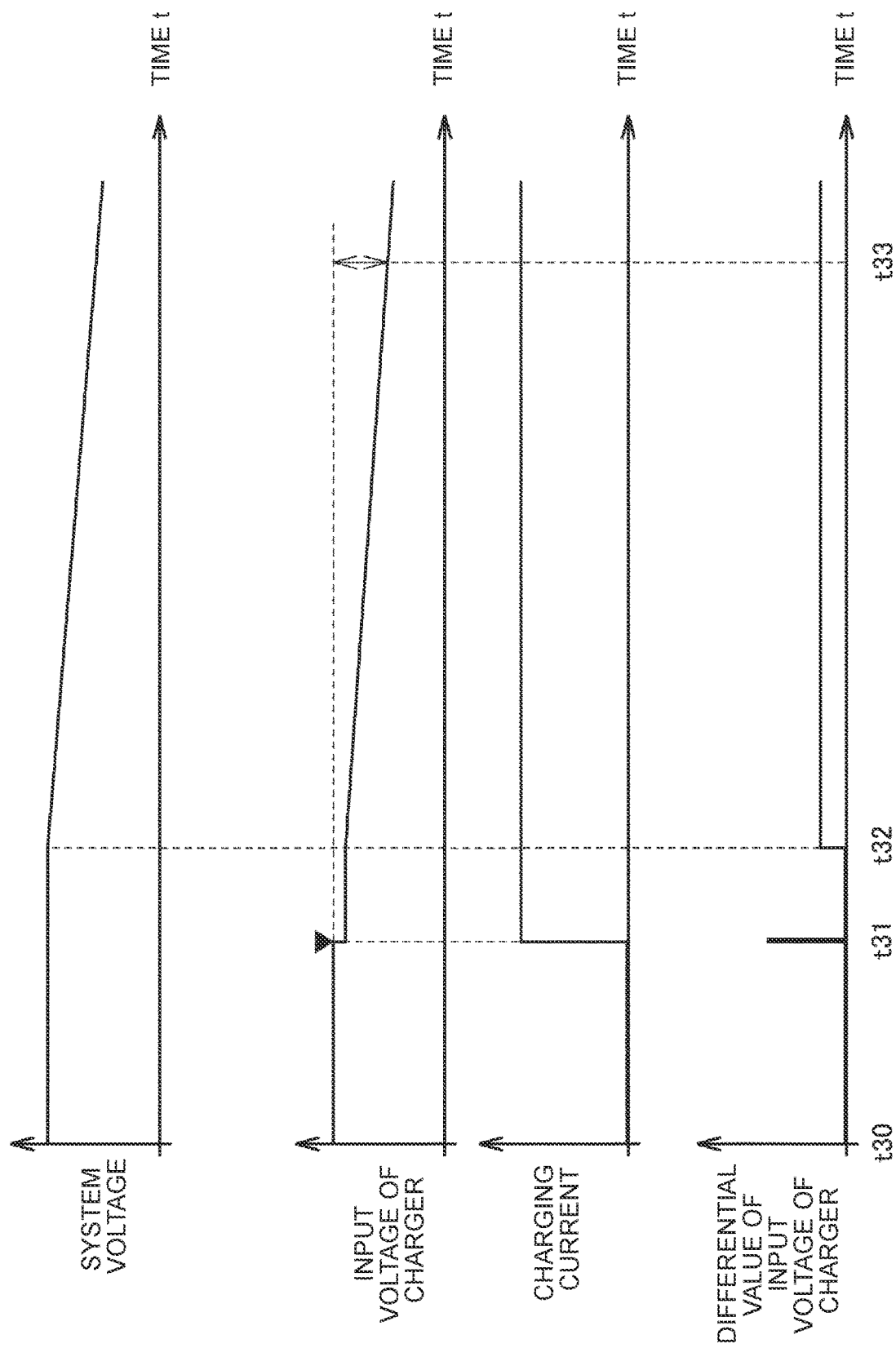
FIG. 9 is a diagram illustrating a detection process according to a fifth modification.

FIG. 9 is a diagram illustrating a detection process according to the fifth modification. FIG. 9 shows temporal changes in the system voltage, the input voltage VIN of the charger 200, the charging current, and the differential value of the input voltage of the charger 200 (hereinafter simply referred to as "differential value") in order from the top.

At a time t30, the charging connector 410 is connected to the inlet 220, and a charging start operation is performed. Accordingly, the input voltage VIN from the charging equipment 500 is applied to the inlet 220 (charger 200). When the ECU 300 detects that the charging connector 410 is connected to the inlet 220, the ECU 300 starts the detection process and executes the first process.

At a time t31, the ECU 300 controls the charger 200 to start the AC charging. When the AC charging is started, the charging current flows from the charging equipment 500 to the vehicle 1 via the charging cable 400, and the input voltage VIN of the charger 200 decreases. When the AC charging is started, the ECU 300 acquires a detected value from the voltage sensor 230 and calculates a differential value at predetermined intervals. Then, the ECU 300 compares the differential value with a threshold value Vdth. The threshold value Vdth is determined in advance based on, for example, statistics of past fluctuations in the system voltage, and is stored in the memory of the ECU 300. The ECU 300 tentatively detects an impedance abnormality in the charging path when the differential value is equal to or larger than the threshold value Vdth.

In the example shown in FIG. 9, the system voltage starts to gradually decrease at a time t32. The system voltage gradually decreases over a long period of time.

For example, in a configuration in which the impedance abnormality in the charging path is tentatively detected based on the fluctuation value of the input voltage VIN, the amount of voltage decrease from the input voltage VIN before the start of the AC charging (between the time t30 and the time t31) exceeds the threshold value Vth at the time t32, and the impedance abnormality in the charging path is tentatively detected. As a result, the AC charging is suspended even though the impedance in the charging path is normal. By using the differential value, it is possible to suppress the tentative detection of the impedance abnormality in the charging path when the impedance in the charging path is normal.

Figure 10:
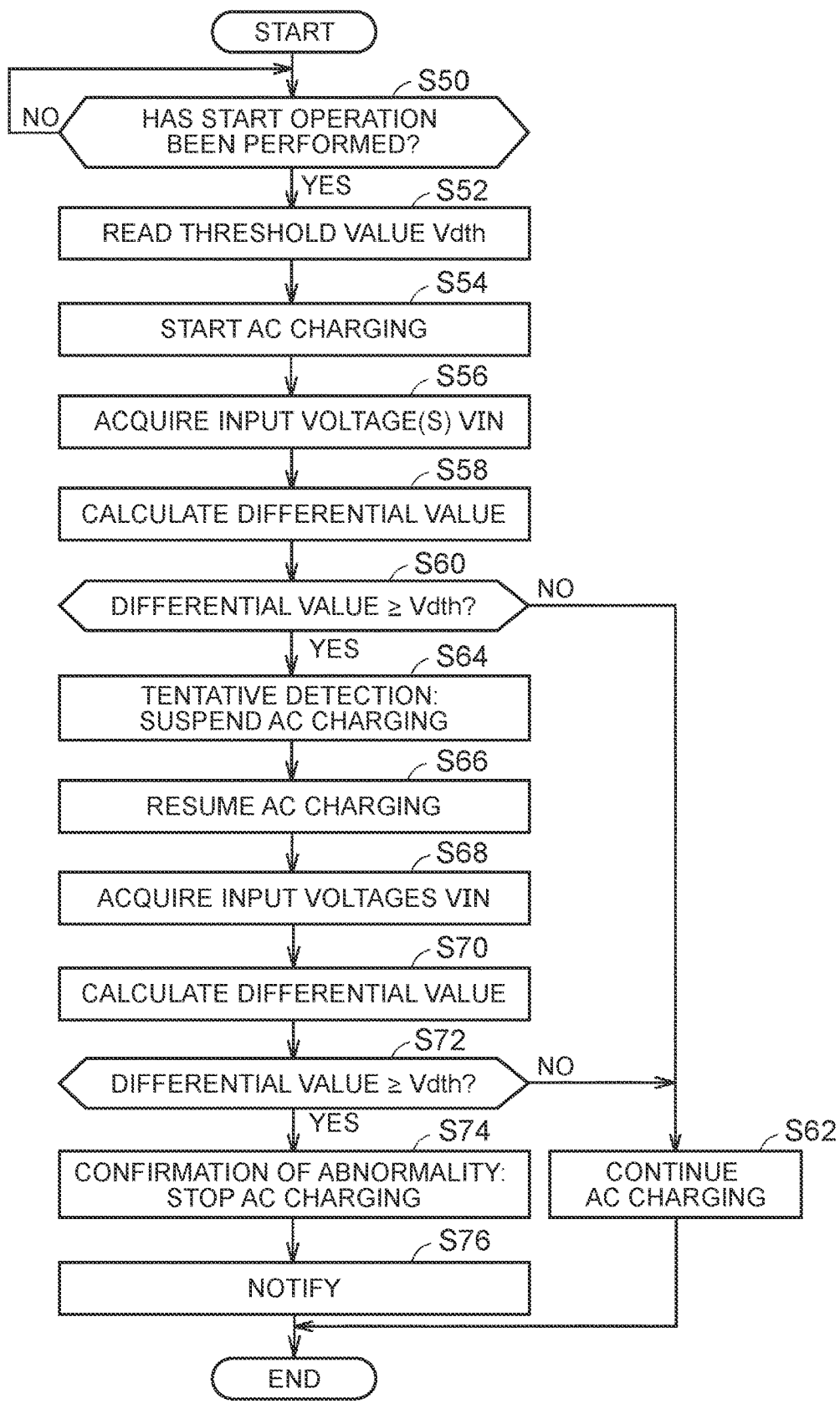
FIG. 10 is a flowchart showing a procedure of the detection process to be executed in the fifth modification.

FIG. 10 is a flowchart showing a procedure of the detection process to be executed in the fifth modification. Similarly to the embodiment, the process in the flowchart of FIG. 10 is started by the ECU 300 when the charging connector 410 is connected to the inlet 220.

In S50, the ECU 300 determines whether a charging start operation has been performed. When the ECU 300 determines that the charging start operation has not been performed (NO in S50), the ECU 300 waits for the charging start operation. When the ECU 300 determines that the charging start operation has been performed (YES in S50), the process proceeds to S52.

In S52, the ECU 300 reads the threshold value Vdth from the memory (not shown).

In S54, the ECU 300 controls the charger 200 to start the AC charging.

In S56, the ECU 300 acquires a detected value from the voltage sensor 230 as the input voltage VIN. When the process in S56 is executed for the first time after the start of this flowchart, the process in S56 is executed twice at a predetermined periodic interval.

In S58, the ECU 300 calculates a differential value based on a previously acquired input voltage VIN and the input voltage VIN acquired in S56. When the process in S56 is executed for the first time after the start of this flowchart, the ECU 300 calculates the differential value based on two input voltages VIN acquired in S56.

In S60, the ECU 300 determines whether the differential value is equal to or larger than the threshold value Vdth. When the ECU 300 determines that the differential value is smaller than the threshold value Vdth (NO in S60), the process proceeds to S62. When the ECU 300 determines that the differential value is equal to or larger than the threshold value Vdth (YES in S60), the process proceeds to S64.

In S62, the ECU 300 continues the AC charging because the differential value is a normal value.

In S64, the ECU 300 tentatively detects an impedance abnormality in the charging path because the differential value is an abnormal value. At this time, the ECU 300 controls the charger 200 to suspend the AC charging.

In S66, the ECU 300 controls the charger 200 to resume the suspended AC charging.

In S68, the ECU 300 acquires detected values from the voltage sensor 230 as the input voltages VIN twice at a predetermined periodic interval.

In S70, the ECU 300 calculates a differential value based on the input voltages VIN acquired in S68.

In S72, the ECU 300 determines whether the differential value is equal to or larger than the threshold value Vdth. When the ECU 300 determines that the differential value is smaller than the threshold value Vdth (NO in S72), the process proceeds to S62. When the ECU 300 determines that the differential value is equal to or larger than the threshold value Vdth (YES in S72), the process proceeds to S74.

In S74, the ECU 300 confirms the impedance abnormality in the charging path because the differential value is abnormal. At this time, the ECU 300 controls the charger 200 to stop the AC charging.

In S76, the ECU 300 controls the notification device 600 to notify the user of the vehicle 1 that the AC charging has been stopped due to the impedance abnormality in the charging path.

By using the differential value as described above when the system voltage gradually fluctuates over a long period of time, it is possible to suppress the tentative detection of the impedance abnormality in the charging path when the impedance in the charging path is normal.

The embodiment disclosed herein shall be construed as illustrative and not restrictive in all respects. The scope of the present disclosure is shown by the claims rather than by the above description of the embodiment, and is intended to include all modifications within the meaning and scope equivalent to those of the claims.

What is claimed is:

1. A vehicle configured such that an on-board battery is chargeable by receiving electric power supplied from a power supply outside the vehicle via a charging cable, the vehicle comprising:
   an inlet to which a connector of the charging cable is connectable;
   a voltage sensor configured to detect an input voltage that is a voltage input from the power supply to the inlet; and
   an electronic control unit configured to execute a detection process in a state in which the connector is connected to the inlet, wherein the detection process includes:
      acquiring a first voltage that is the input voltage before a start of a charging;
      starting the charging after acquiring the first voltage;
      acquiring a second voltage that is the input voltage after the start of the charging;
      calculating a first difference between the first voltage and the second voltage, and when the first difference is equal to or larger than a threshold value, suspending the charging;
      acquiring a third voltage that is the input voltage during the suspension of the charging;
      resuming the charging after acquiring the third voltage;

acquiring a fourth voltage that is the input voltage after the resumption of the charging;

calculating a second difference between the third voltage and the fourth voltage, and when the second difference is equal to or larger than the threshold value, stopping the charging;

determining an impedance abnormality in a charging path has occurred when the second difference is equal to or larger than the threshold value; and when the second difference is smaller than the threshold value, determining that the first difference is equal to or larger than the threshold value is due to a decrease in the system voltage, wherein the threshold value is prestored based on a rated current of the charging cable and is dynamic based on a rated current provided by the power supply, a map is prestored to indicate a relationship between the threshold value and the rated current, the threshold value is set based on checking the rated current against the map.

2. The vehicle according to claim 1, wherein the electronic control unit is configured to:

tentatively detect the impedance abnormality in the charging path from the power supply to the inlet when the difference between the first voltage and the second voltage is equal to or larger than the threshold value.

3. The vehicle according to claim 1, wherein the electronic control unit is configured to continue the charging when the difference between the third voltage and the fourth voltage is smaller than the threshold value.

4. The vehicle according to claim 1, wherein:

the voltage sensor detects the third voltage and the fourth voltage a plurality of times; and the electronic control unit is configured to confirm the impedance abnormality in the charging path when the difference between the third voltage and the fourth voltage is equal to or larger than the threshold value consecutively the plurality of times.

5. The vehicle according to claim 1, wherein the electronic control unit is configured to:

acquire the second voltage within a predetermined period after acquisition of the first voltage; and acquire the fourth voltage within the predetermined period after acquisition of the third voltage.

6. The vehicle according to claim 1, wherein the electronic control unit is configured to set the threshold value based on a rated current of the charging cable.

7. The vehicle according to claim 1, further comprising a current sensor configured to detect an input current that is a current input from the power supply to the inlet, wherein the electronic control unit is configured to set the threshold value based on the input current.

8. The vehicle according to claim 1, wherein:

the electronic control unit is configured to compare the rated current of the charging cable with a preset threshold current; and the electronic control unit is configured not to execute the detection process when the rated current is equal to or larger than the preset threshold current.

9. A vehicle configured such that an on-board battery is chargeable by receiving electric power supplied from a power supply outside the vehicle via a charging cable, the vehicle comprising:

an inlet to which a connector of the charging cable is connectable;

a voltage sensor configured to detect an input voltage that is a voltage input from the power supply to the inlet; and an electronic control unit configured to execute a detection process in a state in which the connector is connected to the inlet, wherein the detection process includes:

acquiring a first voltage that is the input voltage before a start of a charging;

starting the charging after acquiring the first voltage;

acquiring a second voltage that is the input voltage after the start of the charging;

calculating a first difference between the first voltage and the second voltage, and when the first difference is equal to or larger than a threshold value, suspending the charging;

acquiring a third voltage that is the input voltage during the suspension of the charging;

resuming the charging after acquiring the third voltage;

acquiring a fourth voltage that is the input voltage after the resumption of the charging;

calculating a second difference between the third voltage and the fourth voltage, and when the second difference is equal to or larger than the threshold value, stopping the charging;

determining an impedance abnormality in a charging path has occurred when the second difference is equal to or larger than the threshold value; and when the second difference is smaller than the threshold value, determining that the first difference is equal to or larger than the threshold value is due to a decrease in the system voltage, wherein the threshold value is prestored based on a rated current of the charging cable and is dynamic based on a rated current provided by the power supply, a map is prestored to indicate a relationship between the threshold value and the rated current, the threshold value is set based on checking the rated current against the map.

* * * * *